UNITED STATES PATENT OFFICE.

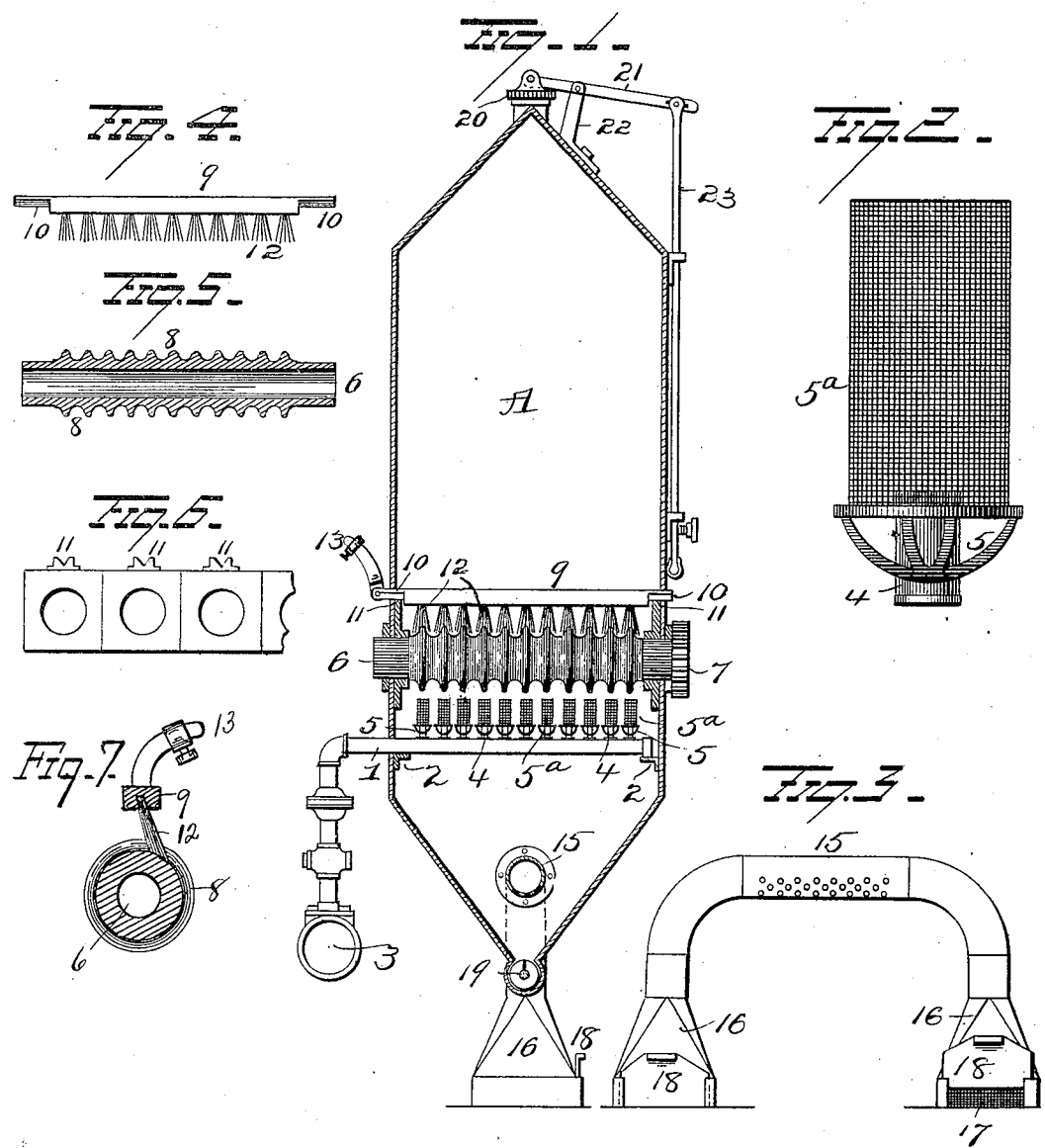

JOHN L. MANN, OF BURROWS, PENNSYLVANIA, ASSIGNOR OF THREE-FOURTHS TO C. H. HEIM, OF KANE, AND N. B. BUBB AND A. D. HERMANCE, OF WILLIAMSPORT, PENNSYLVANIA.

LAMPBLACK-MACHINE.

SPECIFICATION forming part of Letters Patent No. 654,171, dated July 24, 1900.

Application filed December 1, 1899. Serial No. 738,895. (No model.)

*To all whom it may concern:*

Be it known that I, JOHN L. MANN, a resident of Burrows, in the county of McKean and State of Pennsylvania, have invented certain new and useful Improvements in Apparatus for Manufacturing Carbon-Black; and I do hereby declare the following to be a full, clear, and exact description of the invention, such as will enable others skilled in the art to which it appertains to make and use the same.

My invention relates to an improvement in an apparatus for manufacturing carbon-black, the object of the invention being to provide an apparatus of the above-mentioned character which will manufacture the greatest possible amount of carbon-black with the least quantity of gas.

With this object in view the invention consists in certain novel features of construction and combinations and arrangements of parts, as will be more fully hereinafter described, and pointed out in the claims.

In the accompanying drawings, Figure 1 is a view, partly in section, illustrating my improvements. Figs. 2, 3, 4, 5, and 6 are enlarged views of details. Fig. 7 is a partial section showing the relation of the brushes to the roller or tube.

A represents a casing preferably converging at its upper and lower ends, as shown. A gas-pipe 1, disposed horizontally in the casing, near the bottom thereof, is supported on brackets 2, secured to the casing, and communicates with any approved gas-main 3 outside of the casing. The pipe 1 is provided on its upper face with a series of burners 4, on which are mounted brackets 5, adapted to support mantles 5ª, of wire-gauze or other non-inflammable material. A corrugated hollow roller or tube 6 is revolubly mounted at its ends in bearings in the casing, and the ends of said tube preferably project outside of said casing to permit a free circulation of air through them. One end of said tube 6 outside of the casing is provided with a gear 7, adapted to mesh with any approved operating-gear (not shown) for turning the tube. The roller or tube 6 is so corrugated as to form a series of circular enlargements 8, beneath each of which a gas-burner 4 is disposed. A bar 9, preferably having knife-edge trunnions 10, mounted in brackets 11, secured to the casing, is provided with a series of downwardly-projecting brushes 12, (preferably of wire,) held against the corrugated tube 6 by means of a weighted arm 13, connected to one end of the bar and projecting laterally therefrom, so as to tend to turn the bar on its bearings, and thus hold the brushes against the tube and effectually remove the deposit of carbon-black thereon. An air-inlet pipe 15 passes through the casing near the bottom thereof and is provided in its lower face with perforations to permit the escape of air into the casing and at the same time prevent the perforations from being clogged by the falling carbon-black. Each end of the pipe 15 outside the casing is bent downward and communicates with a rectangular hood 16, having a screened opening 17 in one side to permit the entrance of air, and a damper 18 is provided for said opening 17 to regulate the passage of air therethrough.

Any approved worm or other conveyer 19 is provided in the contracted bottom of the casing A to discharge the carbon-black, and a damper 20 is provided in the top of said casing. A lever 21, fulcrumed between its ends on a bracket 22, is connected at one end to the damper 20 and at its free end is provided with a downwardly-extending rod 23, terminating in convenient position to be reached by the operator for operating the damper to regulate the passage of air through the casing.

I would have it understood that I may employ any number of pipes 1, tubes 6, and brush-supporting bars 9 as may be desired; but for the sake of convenience I have only shown one set.

It will be seen that with my improved apparatus the air inlet and damper can be so arranged as to permit any desired circulation of air, and hence regulate the quality of carbon-black made, and it will also be seen that by employing mantles they will regulate the quality of carbon-black and will also prevent the current of air from deflecting the flame, and hence a steady flame will be at all times maintained.

Important features of my invention are the mantles on the burners and the corrugated form of the tube or roller on which the black is deposited. These features coöperate effectually in enhancing the efficiency of the apparatus in the production of a very large quantity of carbon-black of a superior quality. I have found in practice that the perforated mantle serves in a sense to conduct the flame to the surface of the roller and cause it to spread just before it reaches the roller. The flame after passing centrally through the perforated mantle being thus spread out or diffused a large quantity of carbon-black is at once deposited on the roller, and such quantity of black as might remain in the products of combustion escaping from and passing above the roller will be comparatively small. The mantles extend upwardly from the burners and terminate comparatively close to the corrugated roller. Without the use of the perforated mantle the point of the flame will strike the roller, and the consequence is that a large amount of carbon-black will escape past the roller with the products of combustion. By the use of a corrugated roller a very extensive surface is exposed to the flame and will serve to collect a large amount of carbon-black even when the perforated mantle is not used; but with such a roller used in conjunction with the perforated mantle the quantity and quality of the carbon-black deposited will be greatly enhanced.

Various other slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus for manufacturing carbon-black, the combination of a corrugated roller, means for exposing said roller to a flame and means for scraping said roller.

2. In an apparatus for making carbon-black, the combination with a roller having a series of circumferential ridges, of a burner disposed under each ridge and a brush disposed over each ridge.

3. In an apparatus for manufacturing carbon-black, the combination with a circumferentially-corrugated roller, of a series of burners disposed below said roller, a perforated mantle between each burner and said corrugated roller, and brushes over the roller for removing the carbon-black therefrom.

4. In an apparatus for manufacturing carbon-black, the combination with a roller, burners under the roller, a rod disposed above the roller and mounted to rock, brushes carried by said rod and bearing against the roller, and a weighted arm projecting from said rod and tending to cause it to turn or rock on its bearings and press the brushes against the roller.

In testimony whereof I have signed this specification in the presence of two subscribing witnesses.

J. L. MANN.

Witnesses:
E. C. ANDERSEN,
G. F. DOWNING.